United States Patent [19]

Thomas

[11] 4,074,235
[45] Feb. 14, 1978

[54] DATA STORAGE AND RETRIEVAL SYSTEMS

[75] Inventor: Roy Thomas, Ashford, England

[73] Assignee: International Computers Ltd., Stevenage, England

[21] Appl. No.: 626,495

[22] Filed: Oct. 28, 1975

[30] Foreign Application Priority Data

Oct. 29, 1974 United Kingdom ............ 46815/74

[51] Int. Cl.² .............................................. G06F 7/04
[52] U.S. Cl. .................................................. 364/900
[58] Field of Search ............... 340/172.5, 324 M, 337; 445/1

[56] References Cited

U.S. PATENT DOCUMENTS

| 3,107,343 | 10/1963 | Poole | 340/172.5 |
| 3,197,742 | 7/1965 | Rettig et al. | 340/172.5 |
| 3,751,637 | 8/1973 | Dillon et al. | 340/172.5 X |
| 3,760,373 | 9/1973 | Bartz | 340/172.5 |
| 3,768,073 | 10/1973 | Rawson et al. | 340/172.5 |
| 3,956,745 | 5/1976 | Brian | 340/337 |

*Primary Examiner*—Harvey E. Springborn
*Attorney, Agent, or Firm*—George R. Douglas, Jr.

[57] ABSTRACT

A process is disclosed for indexing and retrieving information items recorded on a media and each given an index number. The process uses a criteria recorder having, for each value of a retrieval criterion, a recording position capable of holding a single bit. For each item the recorder is set according to the characteristics of the item and the resulting binary pattern recorded as a train of bits, together with the corresponding index number, on a magnetic index tape. To retrieve items meeting specified retrieval criteria, an electronic register is set with the bit pattern corresponding to those criteria, the tape searched for matching patterns, and the corresponding index numbers displayed as a guide to retrieving the actual items.

7 Claims, 8 Drawing Figures

DATA STORAGE AND RETRIEVAL SYSTEMS

BACKGROUND OF THE INVENTION

This invention relates to a process, and an apparatus, for the indexing and retrieval of data.

There are many known systems for indexing and retrieving information. At one extreme, there are simple sets of sequentially arranged record cards, which are up-dated and searched directly by a user. At the opposite extreme, there are the highly sophisticated systems in which the data is stored in computerised form on, for example, magnetic disc files. The up-dating and searching of data with such a system will probably be carried out by means of a large computer system. The user will communicate with the system by means of a visual display unit, or other form of data terminal.

There have also been proposals for systems in which data is recorded in microfilm, or microfiche, form and each unit of data on the film is accompanied by an encoded recording. This recording would be a bar code representative of a unit serial number, in a typical case. The code representation can be sensed optically to allow automatic selection of a desired unit of data. A system of this last-mentioned kind in which an encoded recording accompanies the film is less expensive than a large computerised system. However, it does require a substantial investment in equipment and also requires skilled staff to operate the system.

SUMMARY OF THE INVENTION

The invention provides a process for retrieving, from a file of information items, each item which matches the desired values of retrieval criteria. A magnetically recorded index tape is formed which is separate from the file of information items and carries details of the values of the retrieval criteria which obtain for each item. In preparing the tape a criteria recorder is used which has a number of recording positions each of which can be either set or unset. Each recording position corresponds to a value of a retrieval citerion, and there is more than one recording position for each criterion, the different positions corresponding to different alternative values of that criterion. For each item, the positions which correspond to the particular values which obtain for that item are set, the remainder being unset. The criteria recorder is read and a string of binary electrical signals generated, each of which represents the setting of one of the recording positions. This string is recorded serially on the magnetic index tape, together with the index number of the item. When it is desired to retrieve those items which have particular desired values of the retrieval criteria, these desired values are entered in an electronic register the binary stages of which correspond to the different retrieval-criterion values, the stages which correspond to the desired values being set and the remainder unset. The index tape is then read and the string of signals representing the retrieval-criterion values of each item compared one by one with the signals representing the stages of the electronic register. Each item for which a predetermined number of set stages of the register match the corresponding signals in the string — and for which, therefore, a desired value obtains for each of a predetermined number of retrieval criteria — has its index number displayed as a guide to retrieving the information item itself from the file of information items.

BRIEF DESCRIPTION OF THE DRAWINGS

The invention will now be described, by way of example, with reference to the accompanying drawings, in which.

DESCRIPTION OF THE PREFERRED EMBODIMENT

As a first example, a form which is manually marked and is then read automatically by an optical mark reading equipment is utilised as a criteria recorder. The function of the criteria recorder is to provide a simple means for containing binary signals which represent the retrieval criteria of the information items.

It will be assumed for the sake of illustration that the employee records of a company are to be made available for information retrieval. The file containing the full details of each employee is recorded on microfilm, for example, and may thereafter be referred to by index number which consists of the reel and frame references.

It may be necessary to search the records on the basis of one or more of a large number of criteria such as age, duration of employment, qualifications, salary, etc. These criteria are sub-divided into ranges, or other alternatives, which will be called the values of the criteria.

Figure 1:
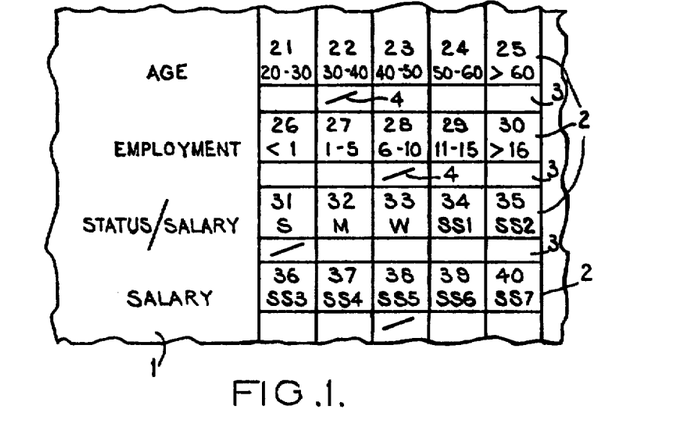
FIG. 1 shows part of a form which is used as a criteria recorder.

All the values of the retrieval criteria which obtain for one employee are recorded on a pre-printed form, which is preferably designed for mark sensing, and which, as has been mentioned, is used as a criteria recorder. Part of such a form 1 is shown in FIG. 1. The form is divided by printed lines to provide groups of boxes 2 and 3. The boxes 2 are numbered serially, numbers 21 to 40 being shown in the drawing, specifying one of the possible values of the criterion to which it relates. Each box also contains criterion information. For example, box serial number 27 relates to employment for a period of 1 to 5 years; box serial number 37 relates to employment in grade SS4 of a salary scale. The criterion headings are printed on the left-hand side of the form against the appropriate line. The user of the form indicates that a particular value of a criterion obtains for the employee by making marks 4, in box 3 which is below the relevant box 2 the recording position formed by the box being thereby set. Preferably, the form is arranged so that it can be read by a conventional optical mark reading equipment 5 (FIG. 3), or alternatively by conventional equipment for conductive mark sensing of record cards. Suitable optical mark readers are available commercially, such as, for example, the Bell and Howell 9000.

Figure 2:
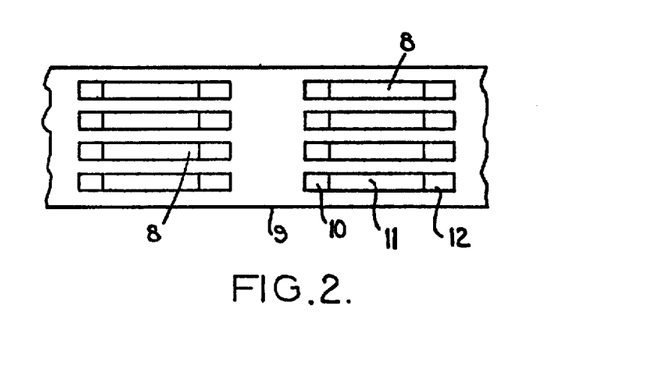
FIG. 2 is a schematic illustration of a recording on part of a magnetic tape.

The mark reader scans the recording positions of the form 1 and loads the result into a buffer 6, a binary 0 and a binary 1 indicating that a position is unmarked and marked, respectively. The buffer unloads the data serially on to a magnetic tape recorder. The recorder preferably employs a cassette mechanism such as is used for recording data signals from telemetry systems. Suitable recorders are available commercially, such as, for example, the Kennedy 330. The recorder may have a four track recording facility so that tape 9 has blocks 8 (FIG. 2a) of data recorded along the tracks. Each of the blocks 8 consists of three main parts, a starter 10, a data part 11 and a label 12. The starter part includes synchronising signals for use during reading, a block number and any other control information which may be required. The data part 11 consists of a string of binary digits which represent the marking positions on the document. The digit string which would represent the positions 21 to 40 of the form shown in FIG. 1 would be 0100000100100000001. The label 12 contains the identifying or index number of the item. In the present example, it would be the reel and frame number on which the data for that particular employee is recorded in full. The label information may be marked on, and automatically read from, the form 1, or it may be entered into the buffer 6 by means of an auxilliary key board 13. Suitable keyboards are available commercially, such as, for example, the Keytronics Inc. PN542. Alternatively, as will be described, the index number can be entered from a matrix of light emmitting diodes.

The forms are read in sequence until the data from all of them has been recorded on the tape 9, which thus forms an index tape for the file of microfilm records. Currently available tape cassettes can provide a recording capacity in excess of 2 million characters. This will be sufficient to accommodate the data from quite a large file. However, it will be appreciated that more than one cassette may be used if this is necessary.

When it is desired to access items from the microfilm file, the cassette is placed in a reader 14. The desired values of retrieval criteria by which the items are to be selected are entered by the operator by means of a key board 15. The key board similar to the keyboard 13 may load data into either register 16, register 17, or logic match circuit 18. The register 16 is loaded with a binary string which represents the values of those criteria which are necessary for an exact match. For example, position 22 will contain a binary one if a requirement is that the employee should be in the 30 – 40 age group.

The register 17 is loaded with a binary string which represents alternative features. For example, a binary one in positions 31 and 33 may be used to indicate that the employee should be either single or widowed.

The contents of the registers can be circulated under control of timing signals on line 19, and applied to comparator circuits 20 and 21. The data read from the tape by unit 14 is also fed to the comparators 20 and 21 via a buffer 22. Thus, the outputs from the two comparators provide an indication of the degree of correspondence between the data string which has been read from the tape 9 and the data in the registers 16 and 17. These outputs are fed to the logic match circuit 18 which determines whether or not the desired degree of correspondence has been achieved. For example, there might be five necessary conditions specified by the register 16 and six alternative conditions specified by the register 17, with a match of three out of the six conditions being acceptable. The number of alternative conditions which is acceptable is fed into the circuit 18 from the key board 15. The comparison circuit may, for example, be as described in U.S. Pat. No. 3,265,974 for improvements in Signal Detecting Methods and Devices issued to Roy Thomas and assigned to English Electric-Leo Computers Limited. The comparators 20 and 21 are thus each an AND-gate which outputs a pulse each time both the bit emerging from the shift register 16 and 17 connected to it and the bit from the tape are a binary one (representing the fact that a particular retrieval-criterion value is both desired and present in the record being read from the tape). The logic match circuit 18 then comprises a counter for each of the gates 20 and 21 which totals the pulses issued by the gate and a decoder which detects whether the output reaches the predetermined value which determines whether the desired degree of correspondence has been achieved. The registers 16 and 17 and the buffer 22 may each be provided in integrated circuit form as one of the two 256-bit shift register of a National Semiconductor MM 5012.

The data output from the buffer 22 is also fed to a display unit 23, which may be a low cost printer, such as for example is available commercially as the Practical Automation Inc. DMTP3, or visual display device, or, alternatively, as will be described, a matrix of light emitting diodes which can also be used as the criteria recorder. The display unit also receives control signals from the logic match circuit 18, so that the unit 23 is caused to display the index number, that is part 22, of each data block which meets the match requirements. The overall operation of the units of the system is synchronised by timing signals which are generated by a control unit 24. Conveniently, the unit 24 may be a suitably programmed mini-computer such as a Digital Equipment Corporation PDP8, or an Intel 8080. The functions performed by the comparators 20 and 21 and by the logic match circuit 18 may also be provided by the mini-computer. Alternatively, these functions may be provided by individual logic circuits which are well known in the art. Other known logic functions such as '*n* out of *m*' and 'not match' may be provided. One or more counters may be provided for tallying the numbers of match conditions of various kinds for the purpose of file analysis.

It will be appreciated that the system described above provides a relatively powerful data retrieval system in a simple manner. This simplicity results particularly from the use of an input record 1 which is simple to code and which provides the data in a manner which is suitable for recording directly on the tape 9 without a complicated encoding process. Because of this lack of encoding, the data may be entered through a manually operated device, if so desired, rather than by use of a mark reader.

A modified arrangement will now be described in which the criteria recorder is in the form of a matrix of light-emitting diodes. The individual diodes are set to be lit or unlit to represent the presence or absence of a particular retrieval criterion value. Thus, each diode corresponds to a box 3 on the form of FIG. 1, and the state of the diode corresponds to the presence or absence of a mark 4 in the box.

Figure 3:
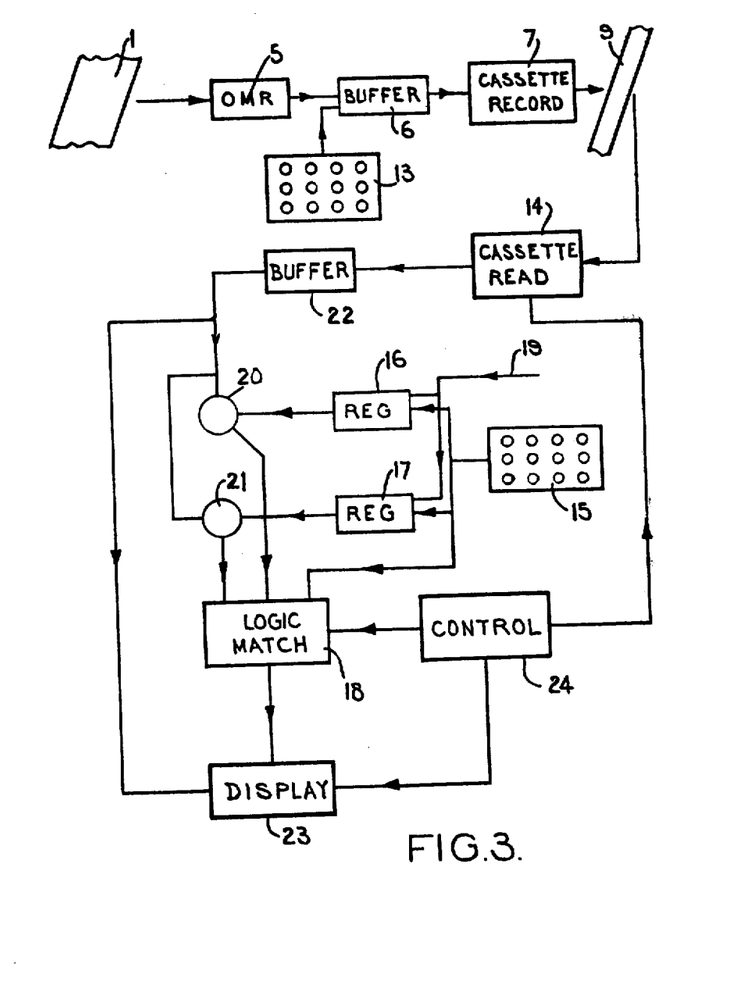
FIG. 3 is a schematic drawing of a search system which uses the tape of FIG. 2.
Figure 4:
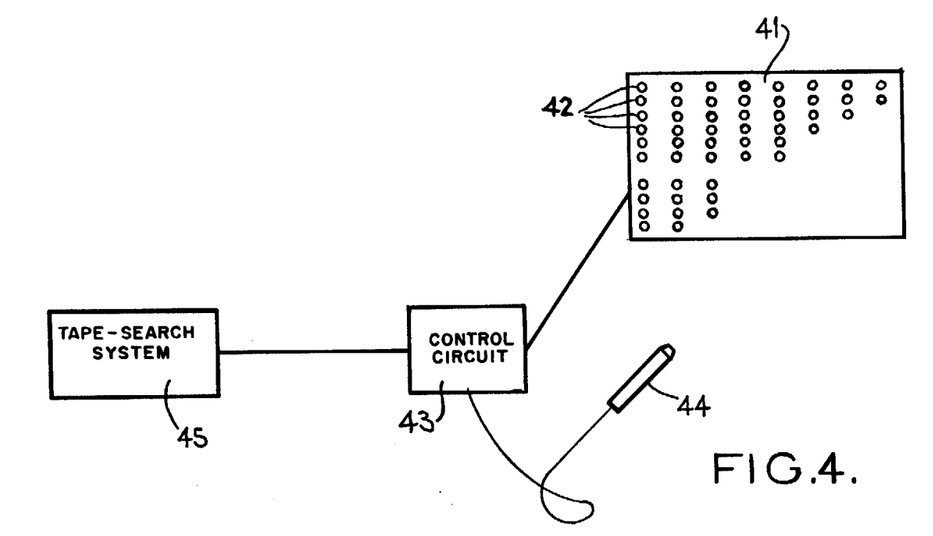
FIG. 4 is a schematic diagram of a second embodiment.

Referring to FIG. 4, the apparatus includes a display 41 formed by a regular array of light-emitting diodes 42 (not all shown). The LEDs are energised by control circuitry 43, to which is also connected a "light-pen" (a wand carrying a photo-sensitive transistor) 44. Data to or from the display passes between the control circuitry 43 and other equipment 45 the nature of which depends on how the display is being used, and in this case comprises the remainder of the tape-search system described with reference to FIG. 3.

Each LED receives an energising waveform containing either short or long pulses. The short pulses are of such a duration that an LED receiving them does not appear lit; the long pulses are of such a duration that the LED appears continuously lit. The pulses are supplied to the LEDs in sequence and are derived from a recirculating shift register with as many stages as there are LEDs.

When the wand 44 is pointed at an LED 42 it senses the flashes resulting from the energising pulses and outputs a signal to the control circuitry 43, which prevents the bit corresponding to the detected LED being recirculated to the first stage of the register. It then, depending on whether it has been switched to a LIGHT or ERASE state, either sets or unsets the first stage of the register, which causes the corresponding LED to be either lit or unlit. The action of the wand 44 is therefore to turn the LED at which it is pointed either on or off.

Once in every scanning cycle the contents of the shift register are transmitted to the other equipment 45, which is thus informed of the state of each LED. The display consequently acts as an input device. It can also act as an output device, because bits from the other equipment 45 can be introduced into the shift register (and thus displayed) in preference to recirculated or newly entered bits.

Figure 5:
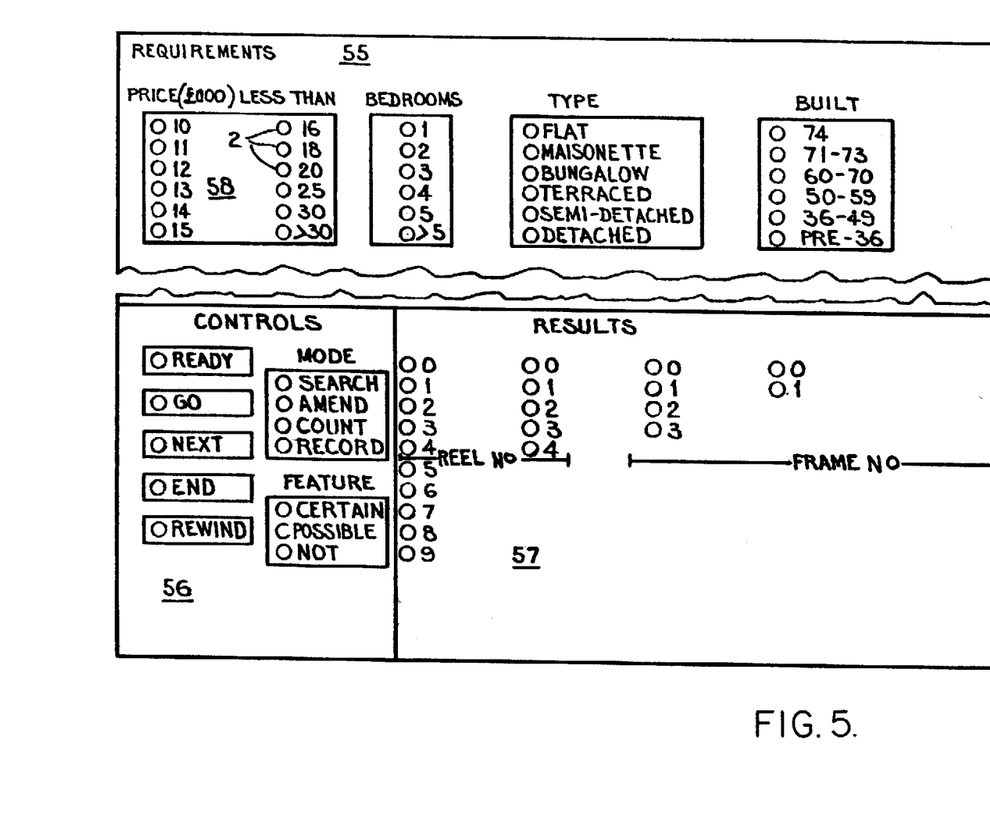
FIG. 5 is a partial illustration of an overlay for use with the embodiment of FIG. 4.

The individual LEDs are labelled by a replaceable partially transparent overlay. FIG. 5 shows an example of an overlay to illustrate the way the display is used. It is mounted in a fame (not shown) which fits precisely in position over the array of LEDs and may, to locate, it be provided with recesses or apertures to engage corresponding projections on the display 41.

Both the entry and display of data can be performed by the display device, the other equipment 45 including in this case a mini-computer having an input register that receives the data output from the display and an output register that supplied data to it.

With the overlay shown in FIG. 5 the system is being used to hold retrieval criterion values of property for sale, the full details of which are held separately on microfilm. The overlay is divided into three sections, a Requirements section 55, a Controls section 56 and a Results section 57. The overlay is generally opaque with transparent panels through which some of the LEDs 42, which are arranged as a regular array, are visible; the panel 58 headed Price is one example. The whole Results section 57 is also transparent. Visible LEDs are labelled by wording or numbers beside them.

Assume first that the device is to be used to from the index tape. The Ready diode in the Controls section 56 will glow to show that the operator can proceed. He will then point the wand 44 at the LED labelled Record in the Mode panel of the Control section 56, and this LED will light up. At the same time the control circuitry 43 will transmit the state of this LED to the mini-computer, which is programmed to recognise the significance of this particular bit being set, when it will be prepared to record the information to follow. (The actual programming of the mini-computer is by well-known techniques and does not form part of this invention). The operator will then input the characteristics of each house to be recorded by pointing at the appropriate LED in each panel of the Requirements section 55 — that, say, the price is less than 14,000 pounds, there are 3 bedrooms and it is a semi-detached house (other features such as the location, type of garage, etc. may be present but are not shown). The details of the house are followed by the reel and frame numbers of the corresponding microfilm record. The various LEDs pointed at will be illuminated. The operator can verify them, change any incorrect ones by using the ERASE switch on his wand, and then, by pointing at the Go LED in the Control section 56 cause them to be recorded.

Other properties can then be recorded similarly.

To find out if there is a property held on microfilm meeting any particular set of criteria the operator first sets the apparatus in the appropriate mode by pointing at the LED labelled Search. He then inputs the requirements, following each by pointing at one of the Feature LEDs to indicate the weight to be attached to that requirement. When he points at Go, bits will be set corresponding to the lit LEDs and the tape will be searched for records having a predetermined logical relationship of match or near-match with these bits. When one is found the mini-computer will halt the tape and output bits causing the appropriate LEDs to display the location in the Results section. When the result has been noted or inspected the operator can continue the search by pointing at Next.

When the tape reaches the end of a track End lights and the operator can cause the tape to be rewound by pointing at Rewind. In this instance the output produced by the mini-computer is a signal controlling the tape apparatus.

In the search mode the Results section is used only for output. It is under the continuous control of the mini-computer and pointing the wand at it has no effect. Similarly (for this application) Ready and End are output LEDs only. Diodes outputting information can be made to flash to attract the operator's attention or act as a warning.

The operation of the matrix of LEDS will now be described in more detail.

Figure 6:
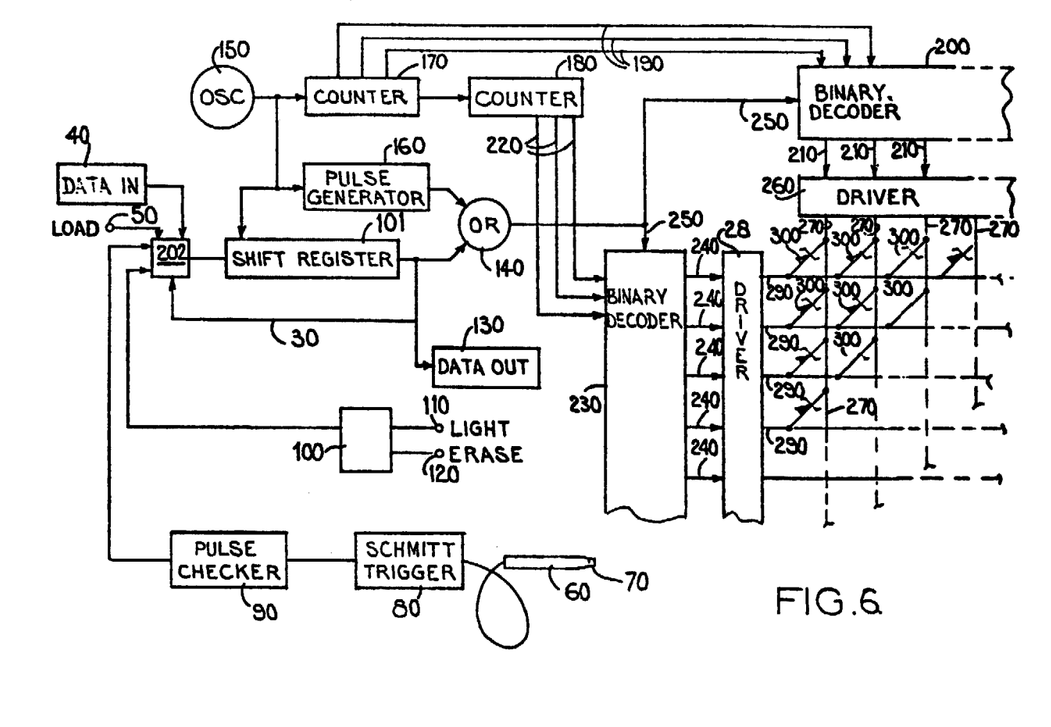
FIG. 6 is a schematic diagram of an arrangement for data input and output.

Referring to FIG. 6 the data to be displayed is held in a shift register 101. It receives its input from a logical net 202 (described in more detail with reference to FIG. 8) to which there are various inputs. One is the output from the register 101 itself, which is recirculated along a path 30. The others the data from an input register 40, entered under the control of a LOAD signal 50, and the signal from a wand 60 holding a photo-sensitive transistor 70. This signal passes through a Schmitt trigger 80 and a pulse checker 90 and is entered under the control of a bistable 100 having a LIGHT state 110 and an ERASE state 120.

Besides being recirculated, the output from the register 101 goes to an output data register 130 and an OR gate 140.

An oscillator 150 clocks the shift register 101. It supplies clock pulses which advance the contents of the register 101 stage by stage. The clock pulses are also supplied to a pulse generator 160, the output of which forms the second input to the OR gate 140; and a pair of binary counters in sequence, a less-significant counter 170 and a more-significant counter 180. The output from the counter 170 is in parallel along the lines 190 and goes to a column decoder 200 having outputs 210 (not all shown); the output from the other counter 180 is in parallel along the lines 220 and goes to a row decoder 230 having outputs 240 (not all shown).

The oscillator 150 produces square-wave clock pulses. At every clock pulse the contents of the shift register 101 are advanced by one stage and the emerging bit is recirculated via the path 30 with the appropriate delay introduced. Thus the position in which any particular bit is stored will vary during the cycle, each bit returning to its original position in the register after a complete cycle of as many clock pulses as there are stages in the register.

The output from the register consists of a waveform containing a signal for each emerging ONE-bit and none for each ZERO-bit. The waveform is repeated once each complete cycle.

The pulse generator 160 produces a short pulse at the start of every clock pulse. The outputs from the pulse generator 160 and the shift register 101 are both applied to the OR gate 140 and if the emerging stored bit is a ONE the signal that represents it will absorb the short pulse from the pulse generator; if the stored bit is a ZERO the OR gate will superimpose the short pulse on the output from the register. Therefore in the output 250 from the gate 140 a long signal represents a ONE-bit and a short signal a ZERO-bit.

The clock pulses are also supplied to the less-significant digital counter 170. It produces a parallel binary output on the lines 190, the output advancing by one at each clock pulse. Every time the counter reaches its maximum it returns to zero and also supplies a signal that advances the second counter 180 which also produces a parallel binary output. This counter returns to zero after the complete clock cycle corresponding to the number of stored bits. With 64 stored bits, the two counters may as an example both count to eight, so that each has the three output lines 190 or 220 as shown. The more-significant counter 180 will then advance once every eight clock pulses and return to zero after 64 pulses.

The binary decoder 200 has a separate output 210 for each value of the counter 170, and (provided it is enabled — see below) produces a signal on the line 210 corresponding to the current value of the counter. The output of the decoder 200 thus scans the various lines 210 in turn. The decoder 230 functions similarly and produces an output on each line 240 in turn, the signal advancing once every cycle of the decoder 200. There are thus, at any one time, outputs to a pair of lines 240 and 270. The drivers 260 and 280 then allow current to flow through the corresponding pair of lines 270 and 290, energising the light-emitting diode 300 that connects them.

The two decoders 200 and 230 and enabled by the output 250 from the OR gate 140. Each output 210 from the column decoder 200 passes through a driver 260 to a line 270 and each output 240 from the row decoder 230 passes through a driver 280 to a line 290; the two drivers 260 and 280 are described in more detail with reference to FIG. 7.

Light-emitting diodes 300 (not all shown) are connected as an orthognal array or matrix between each of the pairs of lines 270 and 290. These diodes 300 display the data stored in the register 101. there are as many diodes 300 as there are stages in the register 101, which in turn equals the number of bits to be displayed.

The operation of the device will now be described. It will first be assumed that the register 101 has just been loaded with input data and that no signal is being received from the photo-sensitive transistor 70 in the wand 60. That means that the device is displaying static data which is not being modified by the operator. Under these circumstances the output from the register 101 is recirculated along the path 30 through the network 202 back to the input to the register 101.

Each stage of the register 101 will hold a separate one of the bits to be displayed, the stage being (say) set if it holds the value ONE and unset if it holds the value ZERO. As an example, it has proved suitable in this form of apparatus to use a register of 64 stages.

The output from the decoders 200 and 230 is inhibited unless there is a signal on the output 250 from the OR-gate 140 which enables the decoders. There is such a signal once every clock interval, either long or short, depending on the value of the corresponding bit at the output of the register 101.

The action of the counters 170 and 180 and the decoders 230 and 250 is thus to scan the diodes 300 one by one and row by row directing energising pulses to each of them in turn.

As a result of being energised each diode 300 emits a flash of light. The length of a flash depends on the length of the energising pulse but its exact shape and timing depends on the characteristics of the diode.

Each individual diode 300 receives the pulses representing the particular bit whose timing corresponds to the stage in the cycle at which it is scanned. Each diode is thus associated with a different bit and will emit either short or long flashes depending on the value of that bit.

The durations of the energising pulses and the frequency of the complete scanning cycle are chosen to be such that a diode energised by long pulses appears lit and substantially flicker-free to an observer in normal lighting conditions, and a diode energised by short pulses appears not to be lit. As examples of values that have proved suitable, with 64 stages the long pulses may be 200 microseconds and take substantially a whole clock interval (giving approximately 78 flashes per second) and the short pulses 20 microseconds.

The appearance of the diodes will depend on the conditions in which they are observed. A diode energised by short pulses which appears completely unilluminated in normal conditions may glow noticeably in a darkened room. Nevertheless there will still be enough contrast between the two stages of illumination for the operation to be able to determine whether a diode is "on" or "off".

The diodes 300 can be overdriven (that is, run at more than their specified power rating) for the short periods they are energised without the average consumption over the whole cycle exceeding that rating. For example, with 64 stages it has been found satisfactory to overdrive the diodes by a factor of four. The apparent brightness will then be greater than if the diodes were run, during the periods for which they are illuminated, at their specified rating. The brightness of the diode can be made variable by providing an adjustment for the degree of overdrive.

Figure 7:
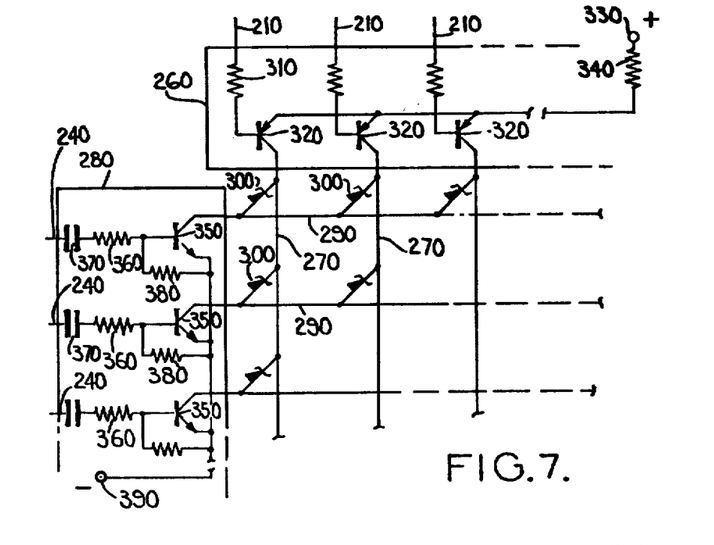
FIGS. 7 & 8 are more detailed schematic diagrams of parts of FIG. 6.

Referring to FIG. 7, the driver circuits 260 and 280 will now be described. Each line 210 is connected to the base of a transistor 320 through a base-current limiting resistor 310. The transistor 320 receiving a signal will supply current from a supply 330 through a power limiting resistor 340 to the corresponding column-conductor 27.

The row-conductors 240 are connected to transistors 350, the appropriate one of which is made conductive by a signal to its base, which is connected through a base current limiting resistor 360 and capacitor 370 to one of the lines 240 and through a bias resistor 380 to the negative supply 390.

The capacitor 370 provides AC coupling to ensure that if the scanning cycle stops the diodes will be protected against overload.

Figure 8:
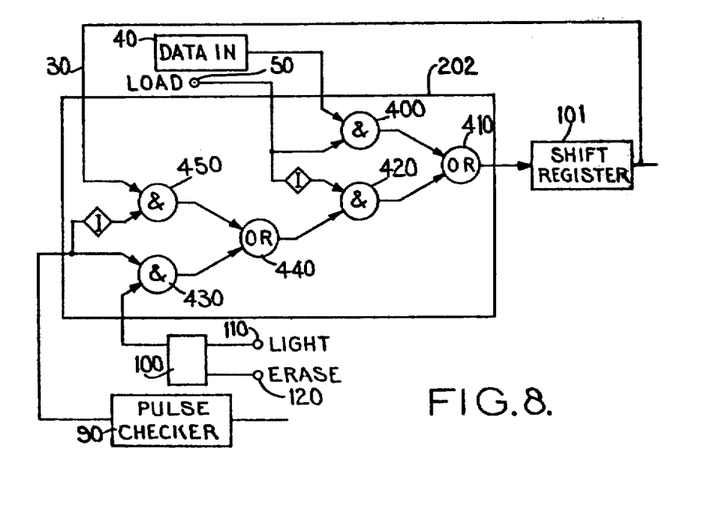

Referring to FIG. 8, the logic net 202 will now be described in more detail. The data from the input register 40 and the LOAD signal 50 are passed through an AND-gate 400 to an OR-gate 410 and thence to the input of the shift register 101. The LOAD signal 50 is also inverted and applied to AND gate 420 whose output is the other input to the OR gate 410.

The outputs from the pulse-checker 90 and bistable 100 pass through an AND-gate 430 to an OR-gate 440. The signal from the pulse-checker is also inverted and applied with the recirculated signal on the path 30 to an AND-gate 450. Its output goes to the OR-gate 440, which feeds the AND-gate 420.

It has so far been assumed that the device is displaying static information. There is then no signal from the pulse checker and no LOAD signal 50. The signal on the path 30 is therefore recircuulated to the register 101. However, the displayed data can also be altered in two ways. First, data can be entered from an external source, for example a computer. This happens when there is a LOAD signal 50, which inhibits recirculation through the gate 420 and allows data from the input register 40 to be admitted. The LOAD signal may be present for a full repeat cycle, allowing a complete fresh set of contents to be entered, or may allow an individual bit to be replaced. By alternately clearing and setting a particular bit at intervals of several cycles the associated diode can be caused to flash, for example to attract an operator's attention.

The state of individual stored bits can also be altered by an operator. Consider the case where he wishes to set the bit associated with an unlit diode. First, the bistable 100, which may be operated by a switch on the wand 60, is set in the LIGHT state in which it produces an output on line 11. Then the operator points the wand 60 at the diode and the photo-sensitive transistor 70 picks up the short flashes from it. For each flash it will produce an output which will be rounded by the cumulative characteristics of the light-emitting diode 300 and the photo-sensitive transistor 70.

This output is checked first for level by the Schmitt trigger 80 which prevents the wand responding to stray light or other diodes and produces a square wave when operated by a valid signal, and then for timing by the pulse-checker 90, which tests for an output just before and after output from the Schmitt trigger 80 is due to start. If these conditons are both met it produces an output.

This inhibits recirculation through the gate 450. The bit which would be due to be recirculated is the bit causing the flash detected (in this instance an unset bit since the diode is unlit). In its place the output from the pulse-checker allows the output from the bistable 100 to be introduced into the shift register, and the appropriate bit is thus set. In the next cycle it will cause a long flash from the associated diode corresponding to the lit state. While the wand is pointed at the diode (and clearly it cannot be removed instantaneously) the pulse-checker will detect these flashes, and reintroduce the bit afresh each cycle.

Alternatively, the pulse-checker can additionally test for a signal after the short pulse is due to be ended. This permits the type of pulse to be determined. A gate can then be included to allow the long pulse to inhibit the transmission of the signal from the pulse; checker to the net 202. Thus only the detection of the initial short pulse inhibits recirculation and sets the appropriate bit.

The erase a bit, the bistable 100 is cleared to the ERASE state and the wand pointed at the associated diode. The pulse-checker will pass the sensed pulse, which inhibits recirculation of the bit that caused the (long) flash. There is now no other signal at the gate 430, so there is no input to the register 101 from the wand. The appropriate bit is thus cleared and the diode extinguished. Again, if the pulse-checker distinguishes between long and short pulses, recirculation can be restored when the short flashes resulting from the cleared bit are detected. The response of the wand and the following circuitry can be made specific enough for there to be a response from one diode at a time only, and not simultaneously from any of its neighbours. This is helped if the photo-transistor 70 is made directional by capping it with a fibre-optic light conducting tube. The diodes may also have a moderately restricted emission angle. There is then no need to provide the operator with any separate control to determine when the wand is to enter data; it is enough for him to bring the wand up to a diode whose state he wants to change. But, if desired, such a control can be provided as a press switch on the wand 60 controlling the signal passing along the line from the wand.

It will be understood that the register 130 of FIG. 6 is equivalent to the buffer 6 of FIG. 3 and the data which is held in it can be used to control recording of a string of binary bits on the tape 9 in a conventional manner.

The examples which have been described above will have made clear the simple manner in which information can be entered and processed. It takes a user of the system only a few minutes of practice to become proficient in entering new information, or in making enquires, whether the uses a form or a matrix of LEDS as the criterias recorder. Furthermore, the use of binary signal strings for representing the criterion makes the necessary apparatus relatively simple and inexpensive.

I claim:
1. A process for retrieving, from a file of information items each identified by an index number, the index number of each item for which a desired value obtains for each of a predetermined number of retrieval criteria, the process comprising:
   forming a magnetically recorded index tape separate from the file of information items by, for each information item, carrying out the steps of:
      providing a criteria recorder having a plurality of recording positions each capable of recording only a single bit by being either set or unset, each recording position corresponding to a value of a retrieval criterion, and there being for each retrieval criterion a plurality of recording positions each corresponding to a different alternative value of that criterion,
   entering the value of each retrieval criterion which obtains for the item by causing only each recording position which corresponds to such a value to be set and the remainder to be unset,
   reading the settings of the recording positions to generate a string of binary electrical signals each representing the
      setting of a different recording position, and magnetically recording the said string serially on the said index tape together with the index number of the information item;

entering each retrieval-criterion value that it is desired should obtain for an item to be retrieved into an electronic register having plurality of binary stages each corresponding to a different retrieval-criterion value, by causing each stage which corresponds to a desired retrieval-condition value to be set, the remainder being unset;

reading the tape to obtain, for each information item, the said recorded string of binary electric signals and index number, outputting the contents of the aid register as a plurality of binary electrical signals each representing the setting of a different one of the said stages;

comparing each binary signal of the said string with the binary signal representing the corresponding stage of the said register; and displaying the index number of each item for which a predetermined number of signals representing set stages in the said register match the corresponding signals in the said string, thereby displaying the index number of each informtion item for which a desired value obtains for each of a predetermined number of retrieval criteria.

2. A process as claimed in claim 1, in which the said step of entering in a criterion recorder the value of each retrieval criterion which obtains for an item comprises marking, on a form having a plurality of marking positions each corresponding to a different retrieval-criterion value, those marking positions only which correspond to the said values which obtain for the item.

3. A process as claimed in claim 1, in which the said step of entering in a criterion recorder the value of each retrieval condition which obtains for an item comprises illuminating, on a matrix of selectively illuminable light-emitting diodes each corresponding to a different retrieval-criterion value, those diodes only which correspond to the said values which obtain for the item.

4. A process as claimed in claim 3, which comprises causing each required diode be lit by detecting with an optical sensing device at least one of a train of timing pulses emitted by the diode which pulses are of insufficient duration and frequency for the diode to appear lit and then supplying pulses to the diode of a sufficient duration and frequency for the diode to appear lit.

5. A process as claimed in claim 4, which comprises storing a string of bits each representing the state of illumination of a different one the said diodes in recirculating shift-register means, repeatedly circulating the said bits in the said means, repeatedly outputting each bit as an electrical signal representing its state, deriving a drive signal from each said electrical signal dependent on the state of the bit it represents, and supplying the said drive signal to the corresponding diode, thereby causing it to be lit or unlit depending on the state of the corresponding stored bit.

6. A process as claimed in claim 3, which comprises entering the index number of each information item on additional selectively illuminable diodes on the said matrix, reading the said additional diodes to generate a string of bits representing the said index number and recording the said string of bits representing the said index number on the index tape together with the said string of bits each representing the setting of a different recording position.

7. A process as claimed in claim 6, in which the step of displaying of the index number of each information item for which a desired value obtains for each of a predetermined number of retrieval criteria takes place on additional selectively illuminable diodes of the said matrix.

* * * * *

UNITED STATES PATENT AND TRADEMARK OFFICE
CERTIFICATE OF CORRECTION

PATENT NO. : 4,074,235
DATED : February 14, 1978
INVENTOR(S) : Roy Thomas

It is certified that error appears in the above-identified patent and that said Letters Patent are hereby corrected as shown below:

Kindly show the Assignee of the Patent to be:

-- Data Recording Instrument Company Limited --
Hawthorne Road
Staines, Middlesex
ENGLAND Signed and Sealed this Sixteenth Day of May 1978

[SEAL]

Attest:

RUTH C. MASON
Attesting Officer

LUTRELLE F. PARKER
Acting Commissioner of Patents and Trademarks